UNITED STATES PATENT OFFICE.

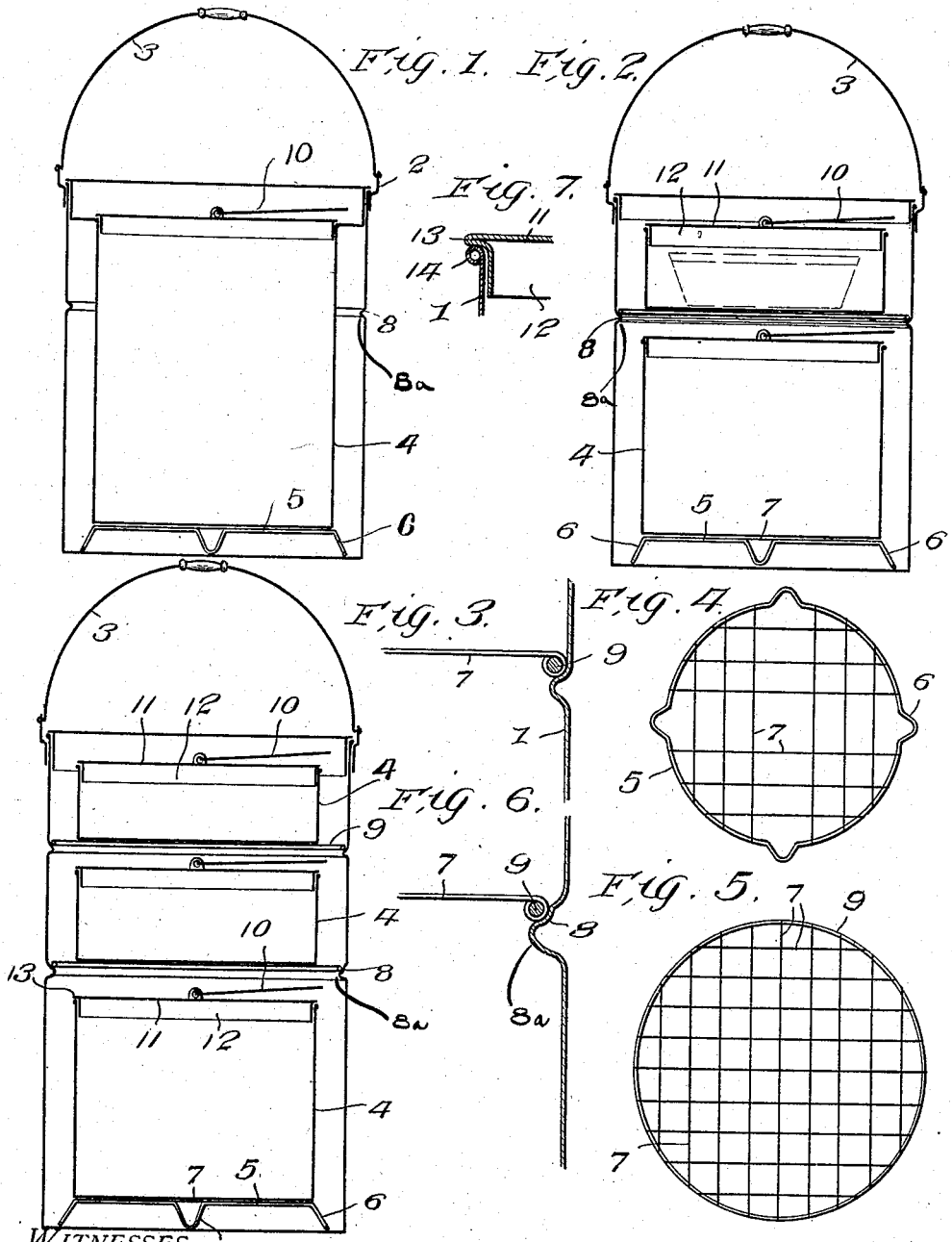

GEORGE WASHINGTON FERGUSON, OF PLYMOUTH, WISCONSIN.

STEAM COOKING APPLIANCE.

No. 911,654.    Specification of Letters Patent.    Patented Feb. 9, 1909.

Application filed May 12, 1908. Serial No. 432,479.

*To all whom it may concern:*

Be it known that I, GEORGE W. FERGUSON, a citizen of the United States, residing at Plymouth, in the county of Sheboygan and State of Wisconsin, have invented certain new and useful Improvements in Steam Cooking Appliances; and I do hereby declare the following to be a full, clear, and exact description of the invention, such as will enable others skilled in the art to which it appertains to make and use the same.

My invention relates to new and useful improvements in steam cooking appliances and more particularly to that class adapted to be used for steaming bread, cereals, etc., and my object is to provide an outer casing which is adapted to contain water and be brought into direct contact with the heat.

A further object is to provide means on the interior of the outer receptacle for supporting a variety of food holding receptacles or utensils one above the other and a still further object is to provide covers for the outer and the inner receptacles and arrange the same in such manner that the steam may escape between the flanges of the covers and the upper ends of the receptacles.

Other objects and advantages will be hereinafter referred to and more particularly pointed out in the claim.

In the accompanying drawings which are made a part of this application, Figure 1 is a sectional view through the cooking appliance showing a single inner receptacle therein. Fig. 2 is a similar view showing the manner of supporting two of the inner receptacles in the outer receptacle. Fig. 3 is a sectional view of the cooker constructed to receive three of the food-holding receptacles. Fig. 4 is a plan view of a support for the lower food receptacles. Fig. 5 is a similar view of a support for the upper receptacle. Fig. 6 is a detail sectional view on an enlarged scale showing the manner of mounting the receptacle supports in the outer casing, and, Fig. 7 is a detail, sectional view showing the manner of placing the covers over the receptacles.

Referring to the drawings in which similar reference numerals designate corresponding parts throughout the several views, 1 indicates the outer receptacle of my improved cooking appliance, to the upper edge of which are secured ears 2, said ears being adapted to receive the ends of a bail 3, through the medium of which the cooking appliance may be readily transported.

The outer receptacle 1 is adapted to contain a quantity of water and to be placed in direct contact with the heat, whereby the water in the receptacle will be thoroughly heated and in order to support an inner receptacle 4 within the outer receptacle 1 and in such position that the water in the outer receptacle may extend around and below the inner receptacle, I provide a suitable support, which consists of a frame 5, which is preferably constructed of wire and circular in form, portions of the frame being bent downwardly to form substantially U-shaped standards 6, said standards supporting the frame at a distance above the bottom of the outer receptacle 1 and in order to support a receptacle of less diameter than the diameter of the frame, strands of wire 7 are secured to said frame and extended in opposite directions, said strands being preferably interwoven with each other. When, however, a plurality of the receptacles 4 are to be placed in the receptacles 1 and one above the other, I provide inwardly extending beads $8^a$ on the inner face of the receptacle 1, each succeeding bead being of less diameter than the preceding bead and the upper face of each bead is provided with a ledge 8 on which is adapted to rest a supporting frame 9. Each supporting frame 9 is of such diameter as to snugly fit its respective ledge and as each succeeding frame is smaller in diameter than the next preceding bead, said supporting frames may be readily introduced or removed from position in the outer receptacle.

The beads $8^a$ are formed by making a circumferential inward depression in the wall of the outer receptacle and in view of the fact that in some instances the food is cooked in the outer receptacle, the lower faces of the beads $8^a$ are curved, whereby the food will readily leave the outer receptacle when said outer receptacle is inverted. The inner receptacles 4 are likewise provided with bails 10, whereby said receptacles may be readily introduced or removed from the outer receptacle and in order to properly retain the heat or steam within the inner and outer receptacles, said receptacles are provided with suitable covers 11, from which depend flanges 12, said flanges being preferably formed integral with the covers and extended inwardly a sufficient distance from their point of juncture with the covers to form a peripheral ledge 13 which ledge is adapted to rest on the bead 14 formed at the upper edge of said receptacles and by forming the flanges 12 slightly smaller in diameter than the interior diameter of the various receptacles, the steam will pass between the flange and wall of the receptacles and escape between the ledge and bead when the pressure within the receptacles has attained a sufficient degree to raise the ledge out of engagement with the bead, but as soon as the pressure has been reduced within the receptacle, the covers will again descend and the ledge rest on the bead.

In applying my improved cooker to use, when a large quantity of any one particular substance is to be cooked, an inner receptacle as shown in Fig. 1, is placed within the outer receptacle and rested upon the frame 5 and by flaring the standards 6 downwardly and outwardly, said inner receptacle is spaced a distance from the wall of the outer receptacle when the inner receptacle is properly located on the frame. If, however, a variety of articles are to be cooked simultaneously, a shorter inner receptacle is placed within the outer receptacle and on the frame 5 as shown in Figs. 2 and 3 and a supporting frame 9 of a size to fit the lowermost ledge introduced into the outer receptacle and properly seated on the ledge and an additional inner receptacle placed thereon, the number of different articles which may be cooked at the same time, depending on the number of ledges in the outer receptacle or a number of small receptacles may be placed on each supporting frame 9 if desired, in which event the larger inner receptacle is omitted at this point.

By introducing the inner receptacles into the outer receptacle in the manner shown, it will be readily seen that steam will surround each of the inner receptacles and thoroughly cook the food contained therein, the steam arising from the water surrounding the lowermost inner vessel passing between the wires on the frames 9 to the upper end of the outer receptacle 1 and when the pressure in the outer receptacle has reached a certain degree, the over-supply of steam will pass between the flange of the cover and wall of the outer receptacle and escape to the outer atmosphere. It will thus be seen that I have provided a very cheap and efficient device for cooking purposes and one wherein a single or variety of different foods may be cooked and it will likewise be seen that the various parts of the cooking device may be readily assembled when employed for cooking a number of different articles and that said articles may be cooked in large or small quantities as desired.

What I claim is:

In a device of the character described, the combination of an outer receptacle, said receptacle having annular inwardly extended beads arranged one above the other and suitably spaced, each bead being increased in depth successively, certain of said beads having their upper portions compressed to form ledges and a supporting frame adapted to engage each of the beads.

In testimony whereof I have signed my name to this specification in the presence of two subscribing witnesses.

GEORGE WASHINGTON FERGUSON.

Witnesses:
M. C. MEAD,
LYDIA FEDLER.